US012662079B2

(12) United States Patent (10) Patent No.: US 12,662,079 B2
Jo (45) Date of Patent: Jun. 23, 2026

(54) AIR BAG DEVICE

(71) Applicant: HYUNDAI MOBIS CO., LTD., Seoul (KR)

(72) Inventor: Kum Ho Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/203,403

(22) Filed: May 9, 2025

(65) Prior Publication Data

US 2026/0008428 A1 Jan. 8, 2026

(30) Foreign Application Priority Data

Jul. 8, 2024 (KR) ........................ 10-2024-0089898

(51) Int. Cl.
 B60R 21/2338 (2011.01)
 B60R 21/207 (2006.01)
 B60R 21/231 (2011.01)

(52) U.S. Cl.
 CPC ........ B60R 21/2338 (2013.01); B60R 21/207 (2013.01); B60R 21/23138 (2013.01); B60R 2021/23146 (2013.01); B60R 2021/23161 (2013.01); B60R 2021/23386 (2013.01)

(58) Field of Classification Search
 CPC .............. B60R 21/2338; B60R 21/207; B60R 2021/23386; B60R 21/23138; B60R 2021/23146; B60R 2021/23161
 See application file for complete search history.

(56) References Cited

U.S. PATENT DOCUMENTS

| | | | | |
|---|---|---|---|---|
| 10,023,147 B2 * | 7/2018 | Kwon | ............... | B60R 21/23138 |
| 10,486,638 B2 * | 11/2019 | Kwon | ................ | B60R 21/2338 |
| 10,543,800 B2 * | 1/2020 | Kwon | .................. | B60R 21/233 |
| 10,870,405 B2 * | 12/2020 | Kwon | .................. | B60R 21/207 |
| 11,066,036 B2 * | 7/2021 | Gwon | .................. | B60R 21/231 |
| 11,285,904 B2 * | 3/2022 | Jung | ................ | B60R 21/207 |
| 11,377,062 B2 * | 7/2022 | Kwon | .................. | B60R 21/231 |
| 11,407,376 B2 * | 8/2022 | Moon | .............. | B60R 21/23138 |

FOREIGN PATENT DOCUMENTS

| | | | | | |
|---|---|---|---|---|---|
| KR | 20220046939 A | * | 4/2022 | ......... | B60R 21/2338 |
| KR | 20240072835 A | * | 5/2024 | ......... | B60R 21/2338 |

OTHER PUBLICATIONS

KR-20240072835-A (machine translation) (Year: 2024).*
KR-20220046939-A (machine translation) (Year: 2022).*

* cited by examiner

*Primary Examiner* — Jason D Shanske
*Assistant Examiner* — Joselynn Y Sliteris
(74) *Attorney, Agent, or Firm* — NSIP Law

(57) ABSTRACT

An air bag device includes an air bag cushion to expand at a lateral surface of a seat back, a first tether that extends through an upper region of the air bag cushion from a lower portion of the seat back to define a loop, and a second tether connected to the first tether and that extends through the air bag cushion at an upper portion of the seat back.

6 Claims, 4 Drawing Sheets

FIG. 2

AIR BAG DEVICE

CROSS REFERENCE TO THE RELATED APPLICATION

This application claims priority from Korean Patent Application No. 10-2024-0089898, filed on Jul. 8, 2024, in the Korean Intellectual Property Office, the disclosure of which is incorporated herein by reference in its entirety.

BACKGROUND

1. Field of the Disclosure

The present disclosure relates to an air bag device configured to support an upper region of a center side air bag at front and rear sides to ensure stable expanding ability of an air bag cushion.

2. Description of the Related Art

A center side air bag is configured to expand between a driver and a passenger in an upward-and-downward direction. The center side air bag is constructed such that a cushion thereof is supported by a center console or between a driver and a passenger so as to prevent not only collision between passengers but also secondary collision.

Such a center side air bag is mounted at a lower portion thereof to a seat back, and the air bag cushion thereof is configured to expand toward an upper side from a lower side.

However, because the point at which the air bag is mounted is limited to the lower portion, movement of the upper portion of the air bag cushion in a rightward-and-leftward direction may occur during expansion of the air bag cushion.

Accordingly, there may be a problem in that the upper region of the air bag cushion is rotated in a rightward-and-leftward direction and/or in a forward-and-rearward direction about the point at which the air bag cushion is mounted on the seat back, thus lowering force of binding a passenger.

Details described as the background art are intended merely for the purpose of promoting an understanding of the background of the present invention and should not be construed as an acknowledgment of the prior art that is already known to those of ordinary skill in the art.

SUMMARY

Therefore, the present disclosure has been made in view of the above problems, and it is an object of the present disclosure to provide an air bag device configured to support an upper region of a center side air bag at front and rear sides to ensure stable expanding ability of an air bag cushion.

Objects, which are to be achieved by the present invention, are not limited to the above-mentioned object, and other objects of the present invention, which are not mentioned above, will be clearly understood by those skilled in the art to which the present invention belongs, from the following descriptions.

In accordance with the present disclosure, the above and other objects can be accomplished by the provision of an air bag device including an air bag cushion configured to expand at a lateral surface of a seat back, a first tether that extends through an upper region of the air bag cushion from a lower portion of the seat back to define a loop, and a second tether connected to the first tether and that extends through the air bag cushion at an upper portion of the seat back.

Two end portions of the first tether may be mounted on the lower portion of the seat back, and an end portion of the second tether may be mounted on the upper portion of the seat back such that the first tether and the second tether are mounted on the upper and lower portions of the seat back at three points to support the air bag cushion.

The lower portion of the seat back may include a plurality of inflator studs, and a plurality of through holes may be disposed in the upper region of the air bag cushion in a forward-and-rearward direction such that the first tether extends through one or more of the plurality of through holes and is mounted on one or more of the plurality of inflator studs.

A first through hole may be disposed in a front end portion of the air bag cushion, and the first tether may extend through the first through hole.

A second through hole may be disposed in a center portion of the air bag cushion, and the first tether may sequentially extend through the first through hole and the second through hole and may be mounted on the lower portion of the seat back.

The first tether may include a first portion connected between a first inflator stud disposed at the lower portion of the seat back and the second through hole, a second portion connected between the second through hole and the first through hole, and a third portion connected between the first through hole and a second inflator stud disposed adjacent to the first inflator stud.

The second tether may be directly connected to the first portion of the first tether.

The second tether may be connected to the first tether, which extends from an inner lateral surface of the air bag cushion.

A third through hole may be disposed in a rear end portion of the air bag cushion, and the second tether may extend through the third through hole.

A point at which the second tether is mounted on the seat back may be positioned higher than the first through hole and the second through hole.

BRIEF DESCRIPTION OF THE DRAWINGS

The above and other objects, features and other advantages of the present disclosure will be more clearly understood from the following detailed description taken in conjunction with the accompanying drawings, in which:

Figure 2:
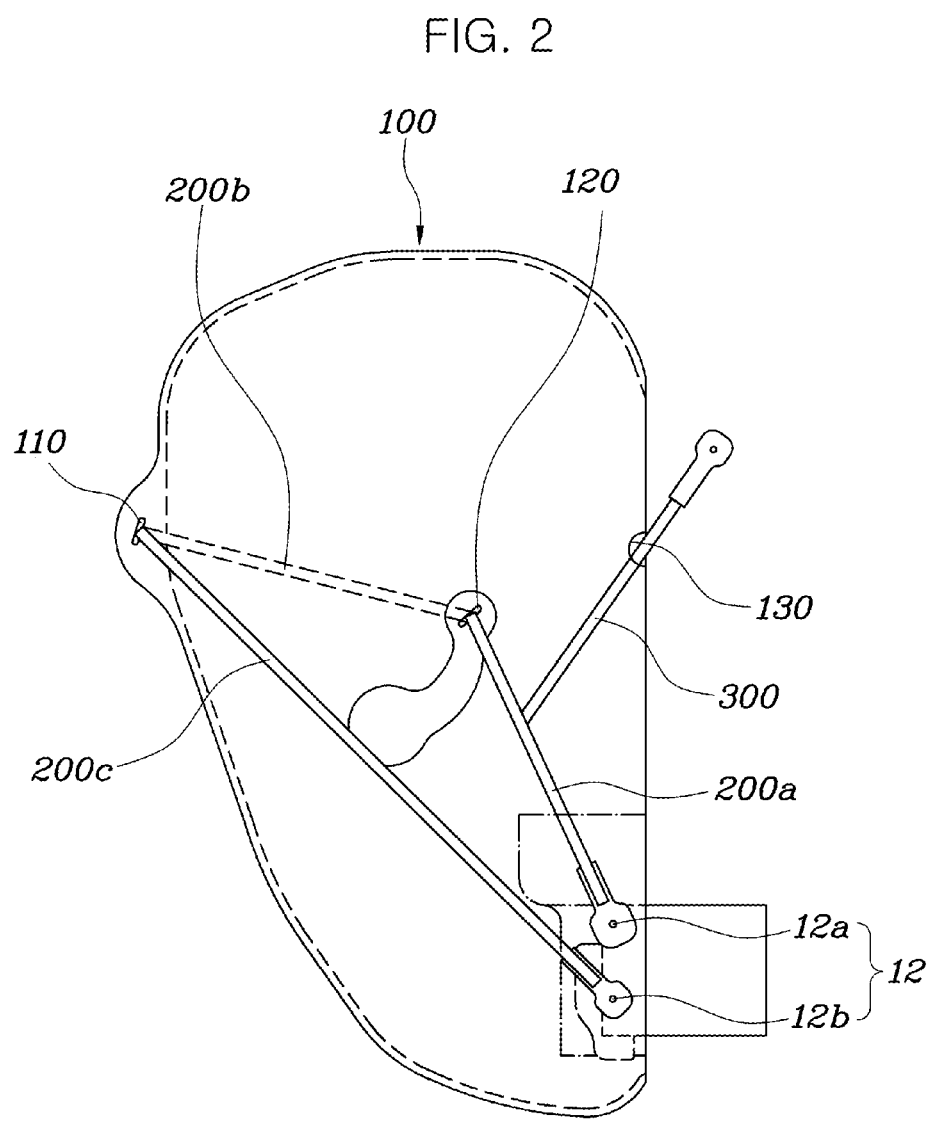

FIG. 2 is a view illustrating a construction in which a first tether and a second tether are connected to the air bag cushion according to the present disclosure;

DETAILED DESCRIPTION

Figure 1:
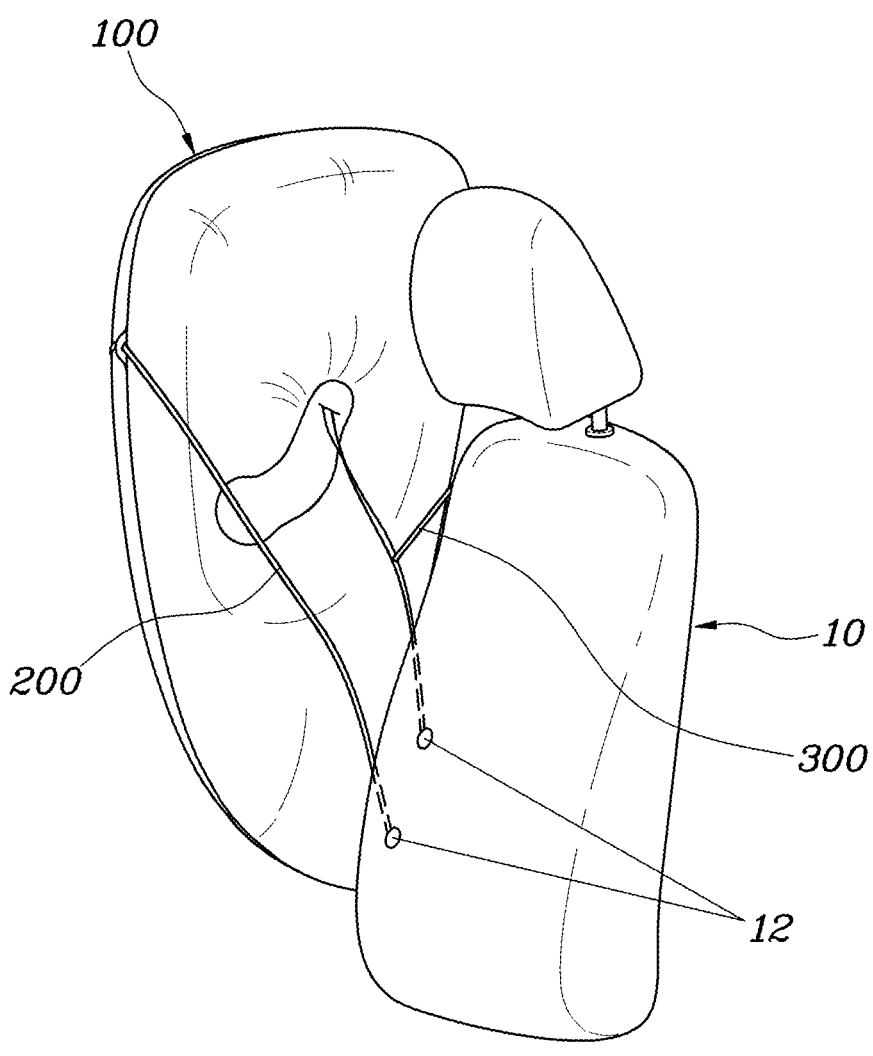
FIG. 1 is a view illustrating expansion of an air bag cushion according to an embodiment of the present disclosure.
Figure 3:
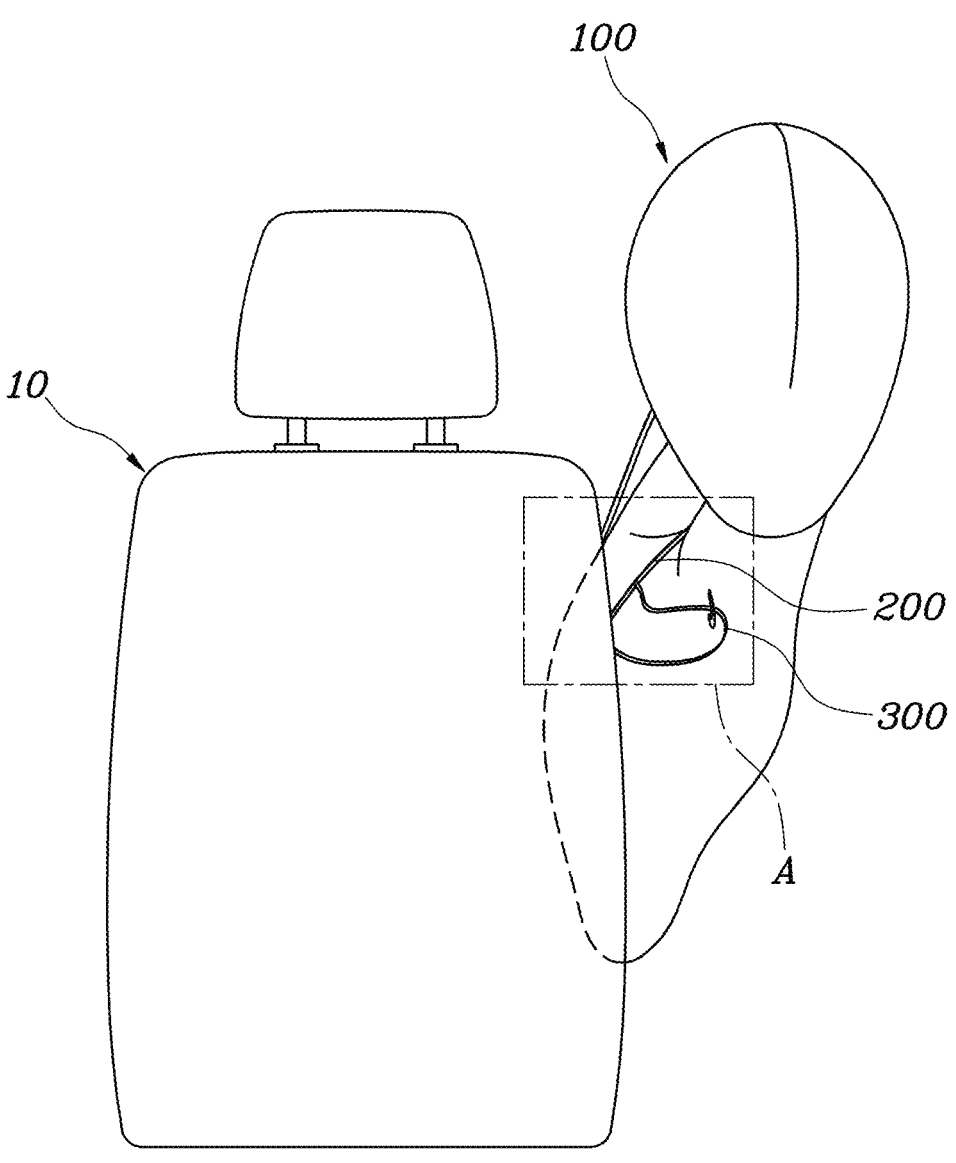
FIG. 3 is a view illustrating a construction in which the second tether is connected to an upper portion of a seat back.
Figure 4:
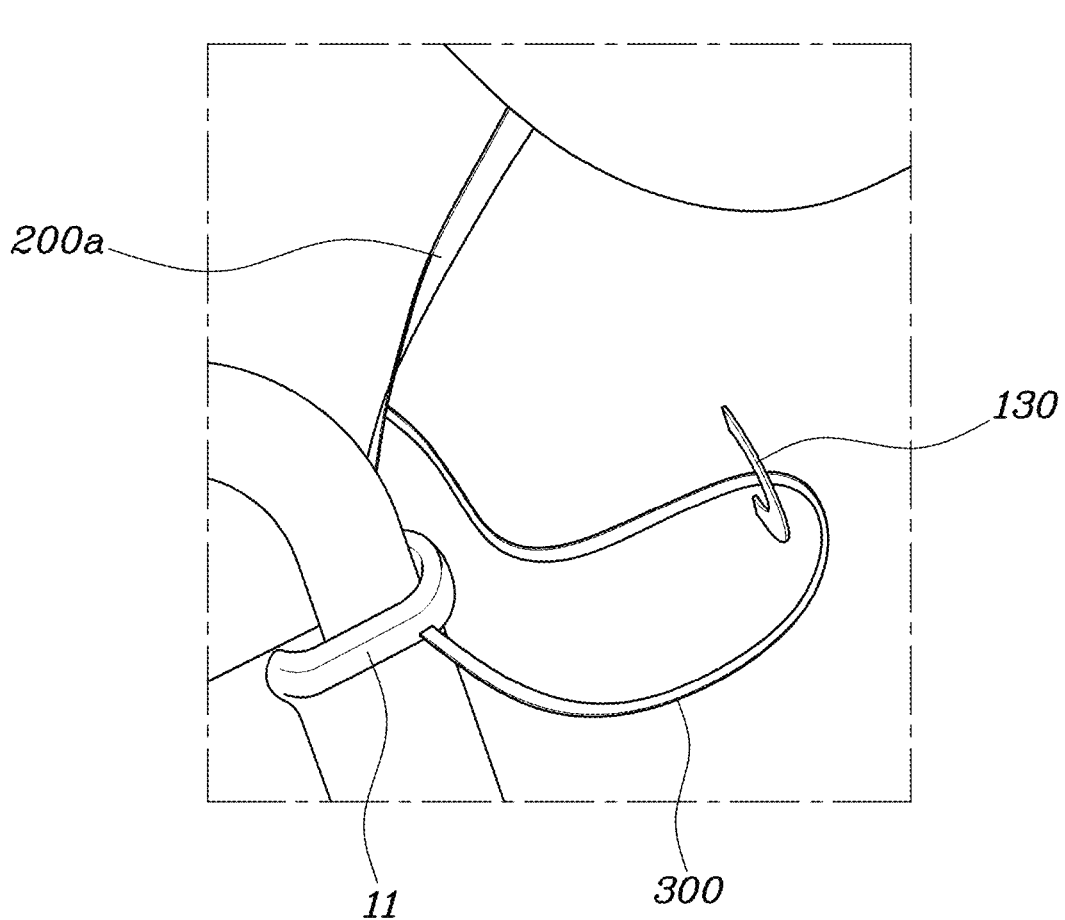
FIG. 4 is an enlarged view of portion A in FIG. 3.

In the following description of embodiments disclosed herein, if it is decided that a detailed description of known functions or configurations related to the invention would make the subject matter of the invention unclear, such detailed description is omitted. The accompanying drawings are used to assist in easy understanding of various technical features, and it should be understood that the embodiments presented herein are not limited by the accompanying drawings. As such, the present disclosure should be construed to extend to any alterations, equivalents, and substitutes, in addition to those which are particularly set out in the accompanying drawings.

It will be understood that although the terms "first", "second", etc. may be used herein to describe various elements, these elements should not be construed as being limited by these terms. These terms are only used to distinguish one element from another.

As used herein, the singular forms "a," "an" and "the" are intended to include the plural forms as well, unless the context clearly indicates otherwise.

It will be further understood that the terms "comprise", "include", "have", etc. when used in this specification specify the presence of stated features, integers, steps, operations, elements, components, or combinations thereof, but do not preclude the presence or addition of one or more other features, integers, steps, operations, elements, components, or combinations thereof.

In general, suffixes such as "module" and "unit", when used in the following description, may be used to refer to elements or components for ease of preparation of the specification. The use of such suffixes herein is merely intended to facilitate the description of the specification, and the suffixes do not imply any special meaning or function.

It should be understood that, when an element is referred to as being "connected to" another element, there may be intervening elements present, or the element may be directly connected with the other element. In contrast, it should be understood that, when an element is referred to as being "directly connected to" another element, there are no intervening elements present.

A description will now be given in detail according to exemplary embodiments disclosed herein, with reference to the accompanying drawings. For the sake of brevity of description with reference to the drawings, the same or equivalent components may be denoted by the same reference numbers, and a description thereof will not be repeated.

An air bag device according to the present disclosure may include an air bag cushion 100 configured to expand at a lateral surface of a seat, a first tether 200 which extends through an upper region of the air bag cushion 100 from a lower portion of the seat to define a loop, and a second tether 300 which extends through the air bag cushion 100 and is connected to the first tether 200 at an upper portion of the seat.

Referring to the drawings, the air bag cushion 100 according to the present disclosure may be an air bag cushion 100 for a side air bag or a center side air bag, and may expand between a driver seat and a passenger seat.

Accordingly, a plurality of inflator studs 12, configured to fix an inflator, may be fastened to a lower portion of a lateral surface of a seat back frame 11 of a driver seat or a passenger seat, and the air bag cushion 100 may be mounted on the inflator stud 12.

The first tether 200, which is mounted at one end portion thereof on the inflator stud 12, may extend through the upper region of the air bag cushion 100 and may be mounted on the inflator stud 12. Consequently, the first tether 200 may extend through the air bag cushion 100 to define a loop and to support the air bag cushion 100.

Particularly, one end portion of the second tether 300 may be mounted on an upper portion of the lateral surface of the seat back frame 11, and the other end portion of the second tether 300 may be connected to the first tether 200 through the upper region of the air bag cushion 100.

As mentioned above, the lower region of the air bag cushion 100 may be mounted on the lower portion of the seat back 10, and the first tether 200, which extends through the upper region of the air bag cushion 100 from the lower portion of the seat back 10, may support the upper region of the air bag cushion 100. Particularly, the first tether 200 may be supported by the second tether 300 connected to the first tether 200 at the upper portion of the seat back 10.

Accordingly, because the upper region of the air bag cushion 100 is stably supported by the first tether 200 and the second tether 300, rotation of the upper region of the air bag cushion 100 in a rightward-and-leftward direction and/or in a forward-and-rearward direction during expansion of the air bag cushion 100 may be prevented, thereby not only reducing difference of expansion between the upper and lower portions of the air bag cushion 100 but also efficiently restraining a passenger head and safely protecting the passenger.

Furthermore, according to the present disclosure, the two end portions of the first tether 200 may be respectively mounted on the lower portion of the seat back 10, and the end portion of the second tether 300 may be mounted on the upper portion of the seat back 10, with the result that the first tether 200 and the second tether 300 may be mounted on the seat back 10 at three points so as to support the air bag cushion 100.

Specifically, two inflator studs 12 may be fastened to upper and lower points of the lower portion of the lateral surface of the seat back 10, and the first tether 200 may be mounted at one end portion thereof to the upper inflator stud 12 and at the other end portion thereof to the lower inflator stud 12.

The rear end portion of the second tether 300 may be mounted on the upper portion of the lateral surface of the seat back 10.

Accordingly, because the first tether 200 is mounted on the lower portion of the seat back 10 at two points and the second tether 300 is mounted on the upper portion of the seat back 10 at one point, the first tether 200 and the second tether 300 may be mounted on the seat back 10 at three points, thereby supporting the upper and lower portions of the air bag cushion 100.

Furthermore, according to the present disclosure, a plurality of inflator studs 12 may be provided at the lower portion of the seat back 10, and a plurality of through holes may be formed through the upper region of the air bag cushion 100 such that the first tether 200 is mounted on the inflator studs 12 through the through holes.

For example, when two through holes are formed through front and rear surfaces of the air bag cushion 100, the first tether 200 mounted on the upper inflator stud 12 may extend upwards and pass through the rear through hole, and the first tether 200 having passed through the rear through hole may extend through the front through hole and may be mounted on the inflator stud 12.

Preferably, a first through hole 110 may be formed through the front end portion of the air bag cushion 100, and the first tether 200 may pass through the first through hole 110.

For example, the first through hole 110 may be formed in the edge of the front end portion of the upper region of the air bag cushion 100.

Consequently, because the first tether 200 catches on the frontmost end portion of the air bag cushion, it is possible to prevent the front portion of the air bag cushion 100 from being moved rightwards or leftwards.

In addition, according to the present disclosure, a second through hole 120 may be formed in the middle of the air bag cushion 100, and the first tether 200 may sequentially pass the first through hole 110 and the second through hole 120, and may be mounted on the lower portion of the seat back.

For example, a dead zone may be formed at the center of the air bag cushion 100 which is not filled with gas, and the second through hole 120 may be formed through the dead zone.

Consequently, the first tether 200, mounted on the upper inflator stud 12, may extend upwards, and may pass through the first through hole 110 formed in the center of the air bag cushion 100, and the first tether 200 having passed through the first through hole 110 may pass through the second through hole 120 positioned at the front side of the air bag cushion 100. The first tether 200 having passed through the second through hole 120 may extend downwards and may be mounted on the lower inflator stud 12.

Accordingly, because the first tether 200, mounted on the inflator stud 12, sequentially passes through the first through hole 110 and the second through hole 120 in the upper region of the air bag cushion 100 and extends in a forward-and-rearward direction, the first tether 200 may define a triangular loop to support the air bag cushion 100.

Therefore, it is possible to prevent rotation of the air bag cushion 100 which would otherwise occur during expansion of the air bag cushion 100 and thus to ensure stable expansion of the air bag cushion 100.

According to the present disclosure, the first tether 200 may include a first portion 200a which is connected between a first inflator stud 12a provided at the lower portion of the seat back 10 and the first through hole 110, a second portion 200b which is connected between the first through hole 110 and the second through hole 120, and a third portion 200c which is connected between the second through hole 120 and a second inflator stud 12b adjacent to the first inflator stud 12a.

For example, the portion of the first tether 200 that is connected between the first inflator stud 12a, which is the upper one of the two inflator studs 12, and the first through hole 110 in the center of the air bag cushion 100 may correspond to the first portion 200a of the first tether 200, and the portion of the first tether 200 that is connected between the first through hole 110 positioned in the center of the air bag cushion 100 and the second through hole 120 positioned at the front side of the air bag cushion 100 may correspond to the second portion 200b of the first tether 200. Furthermore, the portion of the first tether 200 that is connected between the second through hole 120 positioned at the front side of the air bag cushion 100 and the second inflator stud 12b which is the lower one of the two inflator studs 12 may correspond to the third portion 200c of the first tether 200.

Accordingly, according to the present disclosure, the second tether 300 may be directly connected to one of the first portion 200a to the third portion 200c of the first tether 200.

Preferably, the second tether 300 may be directly connected to the first portion 200a of the first tether 200.

Specifically, because the first portion 200a is positioned closer to the upper portion of the seat back 10 than the second portion 200b and the third portion 200c, the length of the second tether directly connected to the first tether 200 may be most shortened when the second tether 300 is connected to the first portion 200a.

Consequently, because the tension of the second tether 300 is maintained in a relatively high and stable state, it is possible to efficiently prevent movement of the air bag cushion 100 in a rightward-and-leftward direction and/or in a forward-and-rearward direction.

The second tether 300 may be connected to the first tether 200 which extends from the inner surface of the air bag cushion 100.

For example, the first portion 200a of the first tether 200 may extend along the inner surface of the air bag cushion 100 that faces a passenger, and the second portion 200b of the first tether 200 may pass through the first through hole 110 and may extend along the outer surface of the air bag cushion 100. The third portion 200c of the first tether 200 may pass through the second through hole 120 and may extend along the inner surface of the air bag cushion 100.

Because the second tether 300 is connected to the first portion 200a of the first tether 200 that extends toward the passenger, the second tether 300 may provide the first tether 200 with force of pulling the first tether 200 toward the passenger, thereby more safely restraining the passenger body which is loaded to the air bag cushion 100.

According to the present disclosure, a third through hole 130 may be formed in the rear end portion of the air bag cushion 100, and the second tether 300 may pass through the third through hole 130.

For example, the third through hole 130 may be formed in the rear edge of the upper region of the air bag cushion 100.

The third through hole 130 may serve as a path for the second tether 300. The second tether 300 may catch on the third through hole 130 and may support the air bag cushion 100, thereby preventing the rear portion of the air bag cushion 100 from being moved in a rightward-and-leftward direction.

Consequently, by virtue of the second tether 300, it is possible to prevent movement of the air bag cushion 100 after expansion of the air bag cushion 100 and to ensure stable expanding ability of the air bag cushion 100.

Furthermore, according to the present disclosure, the mounting point at which the second tether 300 is mounted on the seat back 10 may be positioned higher than the first through hole 110 and the second through hole 120.

For reference, the third through hole 130 may be positioned higher than the second through hole 120.

Specifically, because the mounting point at which the second tether 300 is mounted on the seat back 10 is positioned higher than the first through hole 110 and the second through hole 120 through which the first tether 200 passes, the rear end portion of the upper region of the air bag cushion 100 may be pulled at a relatively high level.

Consequently, the second tether 300 may provide tensile force of pulling the air bag cushion 100 upwards at a position behind the air bag cushion 100, thereby more stably restraining movement of a passenger head.

For reference, the mounting point at which the second tether 300 is mounted on the seat back 10 may be freely changeable depending on a position at which the second tether 300 is bent or a position at which a passenger is restrained.

An operation in which the center side air bag expands by means of the air bag device according to the present disclosure will now be described.

Upon activation of the air bag and thus expansion of the air bag cushion 100, the first tether 200 may be first positioned on a route defined through the first through hole

110 and the second through hole 120, thereby preventing initial movement of the air bag cushion 100 in expansion of the air bag cushion 100.

Subsequently, when the air bag cushion 100 fully expands, the second tether 300 fixed to the upper portion of the seat back 10 may provide force of pulling the first tether 200 rearwards to suppress movement of the air bag cushion 100 in a forward-and-rearward direction.

As described above, according to the present disclosure, the first tether 200, which extends through the upper region of the air bag cushion 100 from the lower portion of the seat back 10, may support the upper region of the air bag cushion 100 and the second tether 300 connected to the first tether 200 at the upper portion of the seat back 10 may support the first tether 200 in the state in which the lower region of the air bag cushion 100 is mounted on the lower portion of the seat back 10.

Consequently, because the upper region of the air bag cushion 100 may be stably supported by the first tether 200 and the second tether 300, it is possible not only to prevent rotation of the upper region of the air bag cushion 100 in a rightward-and-leftward direction and/or in a forward-and-rearward direction during expansion of the air bag cushion 100 to reduce difference in expansion between the upper and lower portions of the air bag cushion 100 but also to more efficiently restrain a passenger head to safely protect the passenger.

As is apparent from the above description, the present disclosure provides advantages in that the upper region of the air bag cushion 100 is stably supported by the first tether 200 and the second tether 300 in order not only to prevent rotation of the upper region of the air bag cushion 100 in a rightward-and-leftward direction and/or in a forward-and-rearward direction during expansion of the air bag cushion 100 to reduce a difference in expansion between the upper and lower portions of the air bag cushion 100 but also to more efficiently restrain a passenger head to safely protect the passenger.

Effects, which can be obtained by the present invention, are not limited to the above-mentioned effects, and other effects of the present invention, which are not mentioned above, will be clearly understood by those skilled in the art to which the present invention belongs, from the following descriptions.

Although the preferred embodiments of the present invention have been described above with reference to the accompanying drawings, those skilled in the art will appreciate that the present invention can be implemented in various other embodiments without changing the technical ideas or features thereof.

What is claimed is:

1. An air bag device, comprising:

an air bag cushion configured to expand at a lateral surface of a seat back;

a first tether that extends through an upper region of the air bag cushion from a lower portion of the seat back to define a loop; and a second tether that extends from an upper portion of the seat back and is connected to the first tether, wherein a first through hole is disposed in a front end portion of the air bag cushion, and the first tether extends through the first through hole, wherein a second through hole is disposed in a center portion of the air bag cushion, and the first tether sequentially extends through the first through hole and the second through hole and is mounted on the lower portion of the seat back, wherein the first tether comprises a first portion connected between a first inflator stud disposed at the lower portion of the seat back and the second through hole, and wherein the second tether is directly connected to the first portion of the first tether.

2. The air bag device of claim 1, wherein two end portions of the first tether are mounted on the lower portion of the seat back, and an end portion of the second tether is mounted on the upper portion of the seat back such that the first tether and the second tether are mounted on the upper and lower portions of the seat back at three points to support the air bag cushion.

3. The air bag device of claim 1, wherein the first tether comprises:

a second portion connected between the second through hole and the first through hole; and a third portion connected between the first through hole and a second inflator stud disposed adjacent to the first inflator stud.

4. The air bag device of claim 1, wherein a point at which the second tether is mounted on the seat back is positioned higher than the first through hole and the second through hole.

5. The air bag device of claim 1, wherein the second tether is connected to the first tether, which extends from an inner lateral surface of the air bag cushion.

6. The air bag device of claim 1, wherein a third through hole is disposed in a rear end portion of the air bag cushion and the second tether extends through the third through hole.

* * * * *